(12) United States Patent
Takahashi et al.

(10) Patent No.: US 12,056,677 B2
(45) Date of Patent: Aug. 6, 2024

(54) MODULE

(71) Applicant: NIDEC SANKYO CORPORATION, Nagano (JP)

(72) Inventors: Kazunori Takahashi, Nagano (JP); Katsuhisa Higashi, Nagano (JP); Yosuke Oguchi, Nagano (JP); Junro Takeuchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/372,499

(22) Filed: Jul. 11, 2021

(65) Prior Publication Data

US 2022/0019987 A1    Jan. 20, 2022

(30) Foreign Application Priority Data

Jul. 17, 2020    (JP) .................................. 2020-122854

(51) Int. Cl.
*G06Q 20/18*    (2012.01)
*G06Q 20/20*    (2012.01)
(Continued)

(52) U.S. Cl.
CPC ........... *G06Q 20/18* (2013.01); *G06Q 20/204* (2013.01); *G06Q 20/352* (2013.01);
(Continued)

(58) Field of Classification Search
CPC .... G07G 1/0018; G07G 1/0045; G07G 1/009; G07G 1/0081; G07F 7/088; G07F 7/0873;
(Continued)

(56) References Cited

U.S. PATENT DOCUMENTS 7,111,776 B2    9/2006    Schoeffler et al.
7,753,269 B2 *  7/2010    Russell .............. G06K 7/10584
                                                         235/385
(Continued)

FOREIGN PATENT DOCUMENTS

CN    101414391    4/2009
CN    204515935    7/2015
(Continued)

OTHER PUBLICATIONS

"Office Action of China Counterpart Application", issued on Apr. 28, 2023, with English translation thereof, pp. 1-17.
(Continued)

*Primary Examiner* — Thien M Le
*Assistant Examiner* — April A Taylor
(74) *Attorney, Agent, or Firm* — JCIPRNET (57)    ABSTRACT

A module provided in a predetermined space of an operation panel of a transaction terminal device to input and output digital information, includes: a wireless unit, a scanner unit, and a housing. The housing has a first front surface member and a second front surface member, a lower side of the first front surface member projects toward an operator with respect to an upper side of the first front surface member, an upper side of the second front surface member projects toward the operator with respect to a lower side of the second front surface member, an antenna of the wireless unit is provided on a back side of the first front surface member, a lower side of the antenna projects toward the operator with respect to an upper side of the antenna, and the scanner unit reads a code through an opening of the second front surface member.

8 Claims, 6 Drawing Sheets

(51) Int. Cl.
*G06Q 20/34* (2012.01)
*G07F 7/08* (2006.01)
*G07F 19/00* (2006.01)

(52) U.S. Cl.
CPC .......... *G07F 7/0873* (2013.01); *G07F 7/0893* (2013.01); *G07F 19/201* (2013.01)

(58) Field of Classification Search
CPC ...... G07F 7/0893; G07F 19/20; G07F 19/201; G07F 19/205; G07F 7/0886; G06K 7/10366; G06K 7/10415; G06K 7/1404; G06K 7/10544; G06K 7/1408; G06K 7/1413; G06K 7/1417; G06K 7/1439; G06K 7/1443; G06K 7/1447; G06Q 20/18; G06Q 20/20; G06Q 20/204; G06Q 20/208; G06Q 20/3278; G06Q 20/352
See application file for complete search history.

(56) References Cited

U.S. PATENT DOCUMENTS

| | | | | |
|---|---|---|---|---|
| 9,563,886 | B1* | 2/2017 | Catoe | G06Q 20/18 |
| 9,928,501 | B1* | 3/2018 | Edwards | G06Q 20/20 |
| 11,438,967 | B2* | 9/2022 | Saeda | H04B 3/54 |
| 2017/0278361 | A1* | 9/2017 | Fujimoto | G07G 1/0045 |
| 2018/0211468 | A1 | 7/2018 | Teshima et al. | |
| 2020/0409872 | A1* | 12/2020 | Katabira | G07G 1/009 |
| 2021/0272090 | A1* | 9/2021 | Shimode | G06F 21/71 |

FOREIGN PATENT DOCUMENTS

| | | | |
|---|---|---|---|
| CN | 206505501 | 9/2017 | |
| CN | 107710288 | 2/2018 | |
| CN | 208985318 | 6/2019 | |
| JP | H09147182 | 6/1997 | |
| JP | 2009237641 | 10/2009 | |
| JP | 2013127706 | 6/2013 | |
| JP | 2015197942 | 11/2015 | |
| JP | 2019133490 A * | 8/2019 | ............ G07F 19/20 |

OTHER PUBLICATIONS

"Office Action of China Counterpart Application", issued on Sep. 29, 2023, with English translation thereof, pp. 1-13.

"Final Office Action of China Counterpart Application", issued on Feb. 7, 2024, with English translation thereof, pp. 1-11.

* cited by examiner

MODULE

CROSS REFERENCE TO RELATED APPLICATION

The present invention claims priority under 35 U.S.C. § 119 to Japanese Application No. 2020-122854 filed Jul. 17, 2020, and the entire content of which is incorporated herein by reference.

BACKGROUND

Field of the Invention

At least an embodiment of the present invention relates to a module.

Description of the Related Documents

Japanese Patent Laid-open No. 2013-127706 describes an information processing system provided with an IC (Integrated Circuit) card reader and an information processing device. Japanese Patent Laid-open No. 2015-197942 describes a configuration in which a card reader is disposed and attached to the inner side (back side) of a front panel constituting a front surface of a housing (frame) of a host device such as an ATM (Automated Teller Machine).

Further, there is known a configuration in which a wireless unit that performs data communication by using NFC (Near Field Communication) is provided in a transaction terminal device such as an ATM. In addition, there is known a configuration in which a scanner unit for reading an external code such as a two-dimensional code is provided in a transaction terminal device such as an ATM.

Each of the above-mentioned wireless unit and scanner unit is provided, for example, in a predetermined space (for example, an opening) in an operation panel of the transaction terminal device. When both the wireless unit and the scanner unit are provided in the transaction terminal device, it is conceivable that the wireless unit and the scanner unit are provided in one housing to form one module, and the module is provided in the predetermined space of the operation panel.

However, it is difficult to miniaturize each of the wireless unit and the scanner unit while maintaining the performance. Therefore, it is difficult to realize a small module that can be provided in a space having a limited size while incorporating a wireless unit and a scanner unit.

At least an embodiment of the present invention has been made in view of the above circumstances, and an object thereof is to provide a small module incorporating a wireless unit and a scanner unit.

SUMMARY

A module of at least an embodiment of the present invention is a module provided in a predetermined space of an operation panel of a transaction terminal device to input and output a digital information, the module including: a wireless unit, configured to perform a data communication using at least a near field communication; a scanner unit, configured to read an external code; and a housing, configured for incorporating the wireless unit and the scanner unit. The housing includes: a first front surface member, disposed obliquely with respect to a vertical direction; and a second front surface member, provided below the first front surface member and disposed obliquely with respect to the vertical direction. A lower side of the first front surface member projects toward an operator with respect to an upper side of the first front surface member. An upper side of the second front surface member projects toward the operator with respect to a lower side of the second front surface member. An antenna of the wireless unit is provided on a back side of the first front surface member. A lower side of the antenna projects toward the operator with respect to an upper side of the antenna. And, the scanner unit is configured to read the external code through an opening of the second front surface member.

According to at least an embodiment of the present invention, it is possible to provide a small module incorporating a wireless unit and a scanner unit.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, at least an embodiment of the present invention will be described with reference to the drawings.

<A Module 100 which is an Example of an Embodiment>

Figure 1:
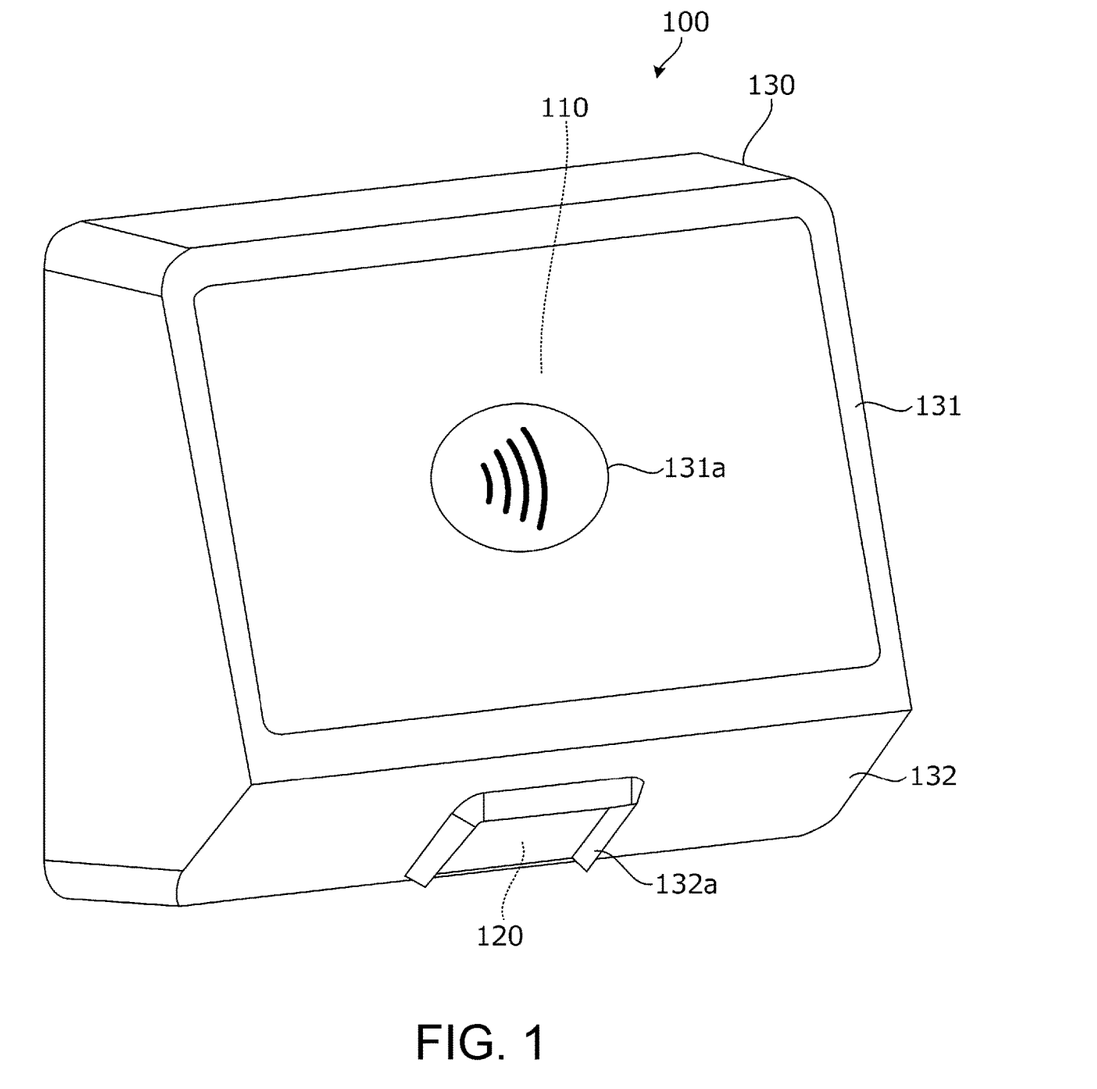
FIG. 1 is a perspective view illustrating an example of a module 100 which is an example of an embodiment.
Figure 2:
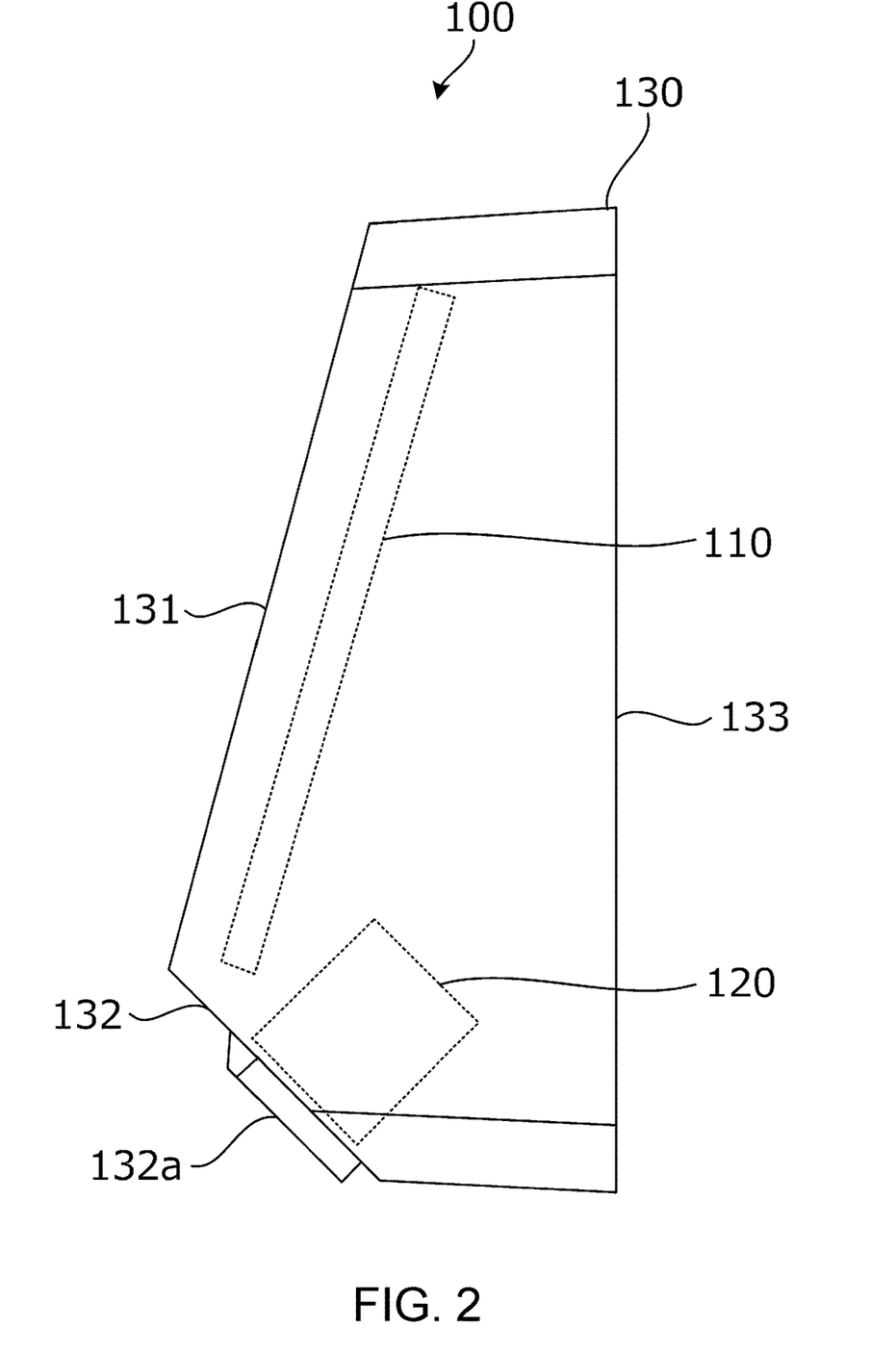
FIG. 2 is a side view illustrating the module 100.
Figure 3:
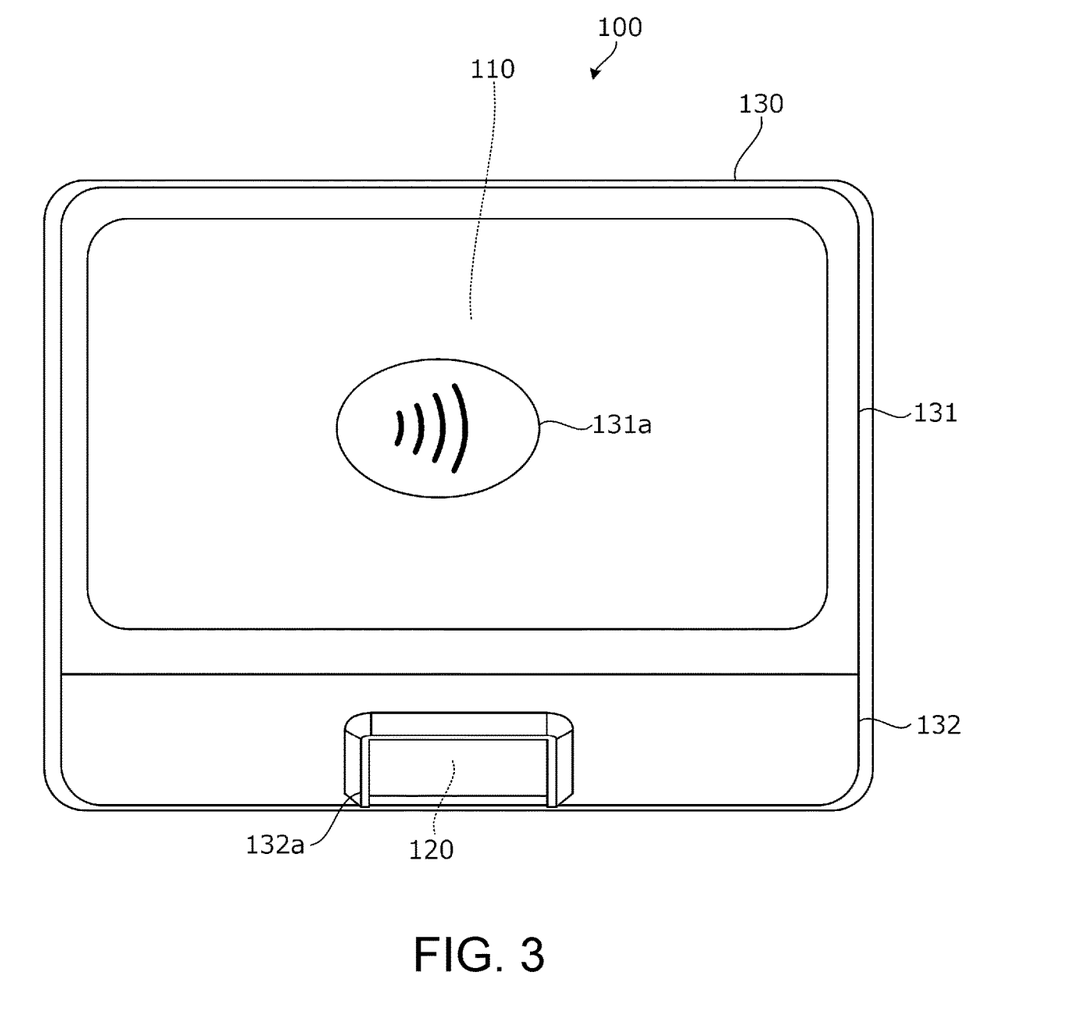
FIG. 3 is a front view illustrating the module 100.

FIG. 1 is a perspective view illustrating an example of a module 100 which is an example of an embodiment. FIG. 2 is a side view illustrating the module 100. FIG. 3 is a front view illustrating the module 100. The module 100 illustrated in FIGS. 1 to 3 is a module provided in a predetermined space of an operation panel of a transaction terminal device (for example, see FIGS. 4 and 5) such as an ATM for inputting/outputting digital information. Specifically, the module 100 includes a wireless unit 110, a scanner unit 120, and a housing 130.

The wireless unit 110 is a unit for inputting data using at least NFC (Near Field Communication). That is, the wireless unit 110 has an antenna and performs wireless communication with an NFC-compatible card (for example, a credit card or a point card) or information terminal (for example, a smartphone or a wearable terminal). The antenna may be realized by, for example, a PCB (Printed Circuit Board) antenna. Further, the wireless unit 110 may be compatible with wireless communication other than NFC.

The scanner unit 120 is a unit for reading an external code. The code is an optically readable code such as a two-dimensional code and a bar code. For example, the code is printed on an object such as paper or displayed on a screen of an information terminal. The scanner unit 120 images this code and processes image data obtained by this imaging to read the data indicated by the code.

The housing 130 is a housing incorporating the wireless unit 110 and the scanner unit 120. As illustrated in FIG. 3, the housing 130 has a substantially rectangular shape when viewed from the front surface side.

The front surface side is, for example, the side of an operator (user) of the transaction terminal device when the module 100 is provided in the transaction terminal device, and is the left side in FIG. 2 or the near side in FIG. 3.

Specifically, the housing 130 has a first front surface member 131, a second front surface member 132, and a back surface member 133. The first front surface member 131 and the second front surface member 132 are members on the front surface side of the housing 130.

The first front surface member 131 is a member that is disposed obliquely with respect to the vertical direction. The vertical direction is, for example, the vertical direction (gravity direction) when the module 100 is provided in the transaction terminal device, and is the longitudinal direction of FIGS. 2 and 3. The lower side of the first front surface member 131 projects toward the operator with respect to the upper side of the first front surface member 131. The lower side is, for example, the lower side when the module 100 is provided in the transaction terminal device, and is the lower side of FIGS. 2 and 3. The upper side is the side opposite to the lower side, and is the upper side of FIGS. 2 and 3.

The second front surface member 132 is a member provided below the first front surface member 131 and disposed obliquely with respect to the vertical direction. The upper side of the second front surface member 132 projects toward the operator with respect to the lower side of the second front surface member 132. The second front surface member 132 is provided with an opening 132a for allowing the scanner unit 120 to read a code.

Further, the first front surface member 131 and the second front surface member 132 are continuous. That is, the lower side of the first front surface member 131 and the upper side of the second front surface member 132 are connected. However, another member (connecting member) may be provided between the lower side of the first front surface member 131 and the upper side of the second front surface member 132.

The back surface member 133 is a member on the back surface side of the housing 130. The back surface side is the side opposite to the front surface side, and is the right side in FIG. 2 and the back side of FIG. 3. The back surface member 133 has, for example, a rectangular plate shape parallel to the vertical direction. Although not illustrated, the back surface member 133 is provided with an opening for introducing wires of the wireless unit 110 and the scanner unit 120 into a control device inside the transaction terminal device.

As illustrated in FIG. 2, the antenna of the wireless unit 110 is provided on the back side of the first front surface member 131, and the lower side of the antenna of the wireless unit 110 projects toward the operator with respect to the upper side of the antenna of the wireless unit 110. The back side of the first front surface member 131 is the side opposite to the operator (right side of FIG. 2) when viewed from the first front surface member 131. In the example of FIG. 2, the antenna is disposed in the housing 130 so as to be parallel to the first front surface member 131. Consequently, for example, an NFC-compatible card or information terminal is brought into contact with or close to the first front surface member 131, so that digital information can be input and output by NFC.

A mark 131a is marked at a position corresponding to the vicinity of the center of the antenna of the wireless unit 110 in a surface on the front surface side of the first front surface member 131. The operator relies on the mark 131a to bring the NFC-compatible card or information terminal into contact with or close to the first front surface member 131.

As described above, the lower side of the first front surface member 131 projects toward the front surface side, so that the wireless unit 110 disposed in parallel with the first front surface member 131 is also disposed obliquely with respect to the vertical direction such that the lower side is the front surface side.

As a result, the vertical length of the wireless unit 110 can be shortened without narrowing the antenna area of the wireless unit 110 as compared with a configuration in which the wireless unit 110 is disposed in the vertical direction. Therefore, it is possible to shorten the vertical length of the module 100 incorporating the wireless unit 110 while securing the antenna area of the wireless unit 110.

Further, a surface of the first front surface member 131 faces diagonally upward, so that it is easy for the operator to bring the NFC-compatible card or information terminal into contact with or close to the first front surface member 131.

Further, as illustrated in FIG. 2, the scanner unit 120 reads a code through the opening 132a of the second front surface member 132. As described above, the upper side of the second front surface member 132 projects toward the front surface side, so that the opening 132a opens diagonally downward, and the reading (imaging) direction of the scanner unit 120 also becomes the diagonally downward direction. Therefore, the scanner unit 120 is also disposed obliquely with respect to the vertical direction.

Herein, the scanner unit 120 is disposed such that one part of the scanner unit 120 fits in a space created by disposing the wireless unit 110 obliquely with respect to the vertical direction. For example, as illustrated in FIG. 2, one part of the scanner unit 120 is located between the lower side of the wireless unit 110 and the back surface member 133 when viewed from the front surface side.

That is, at least the one part of the scanner unit 120 is provided at such a position as to overlap the lower side of the wireless unit 110 in the horizontal direction. The horizontal direction is, for example, the horizontal direction (direction orthogonal to the direction of gravity) when the module 100 is provided in the transaction terminal device, and is the crosswise direction of FIGS. 2 and 3.

Consequently, the wireless unit 110 and the scanner unit 120 can be partially overlapped when viewed from the front surface side, and the vertical length of the module 100 incorporating the wireless unit 110 and the scanner unit 120 can be further shortened.

Further, the reading (imaging) direction of the scanner unit 120 is obliquely downward, so that the operator can easily guide a code displayed on an object such as paper or a screen of an information terminal to a position readable by the scanner unit 120.

For example, the scanner unit 120 irradiates an object to be read with auxiliary light, and reads the code by reflected light of the auxiliary light. The reading (imaging) direction of the scanner unit 120 is obliquely downward as described above, so that the irradiation direction of the auxiliary light is also obliquely downward, and therefore it is possible to avoid direct irradiation to eyes of the operation by the auxiliary light.

The wireless unit 110 and the scanner unit 120 are disposed so as to partially overlap each other when viewed from the front surface side, so that a distance between the information terminal and the wireless unit 110 gets close when the information terminal is brought close to the scanner unit 120 (opening 132a) in order to cause the scanner unit 120 to read the code displayed on the information terminal.

Therefore, for example, in a case where the information terminal is compatible with NFC, when the scanner unit 120 reads the code displayed on the information terminal, data communication by NFC is further performed between the information terminal and the wireless unit 110. That is, the reading of the code displayed on the information terminal by the scanner unit 120 and the data communication by NFC between the information terminal and the wireless unit 110 can be performed in parallel.

<A Transaction Terminal Device Provided with the Module 100>

Figure 4:
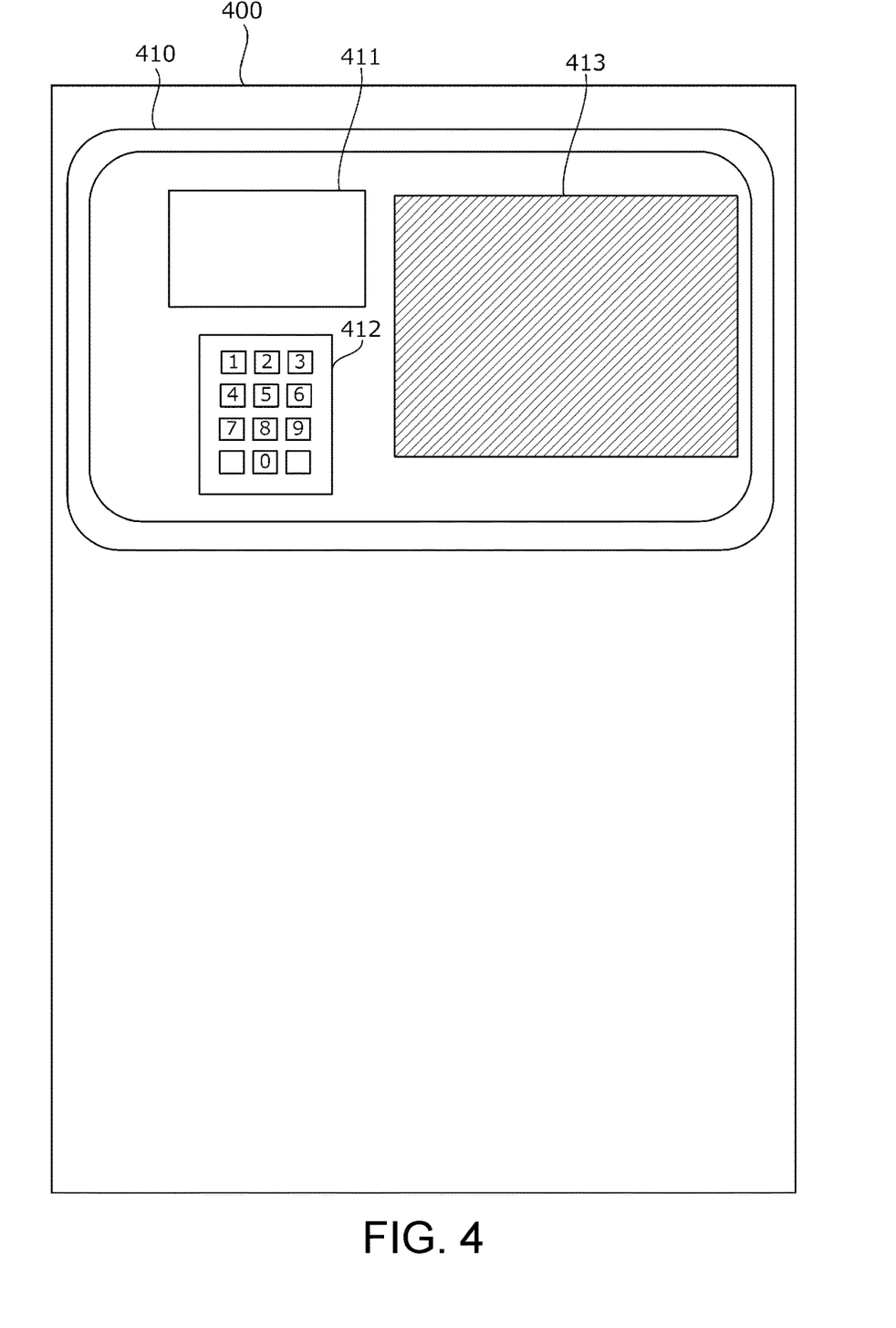
FIG. 4 is a diagram (No. 1) illustrating an example of the transaction terminal device provided with the module 100.
Figure 5:
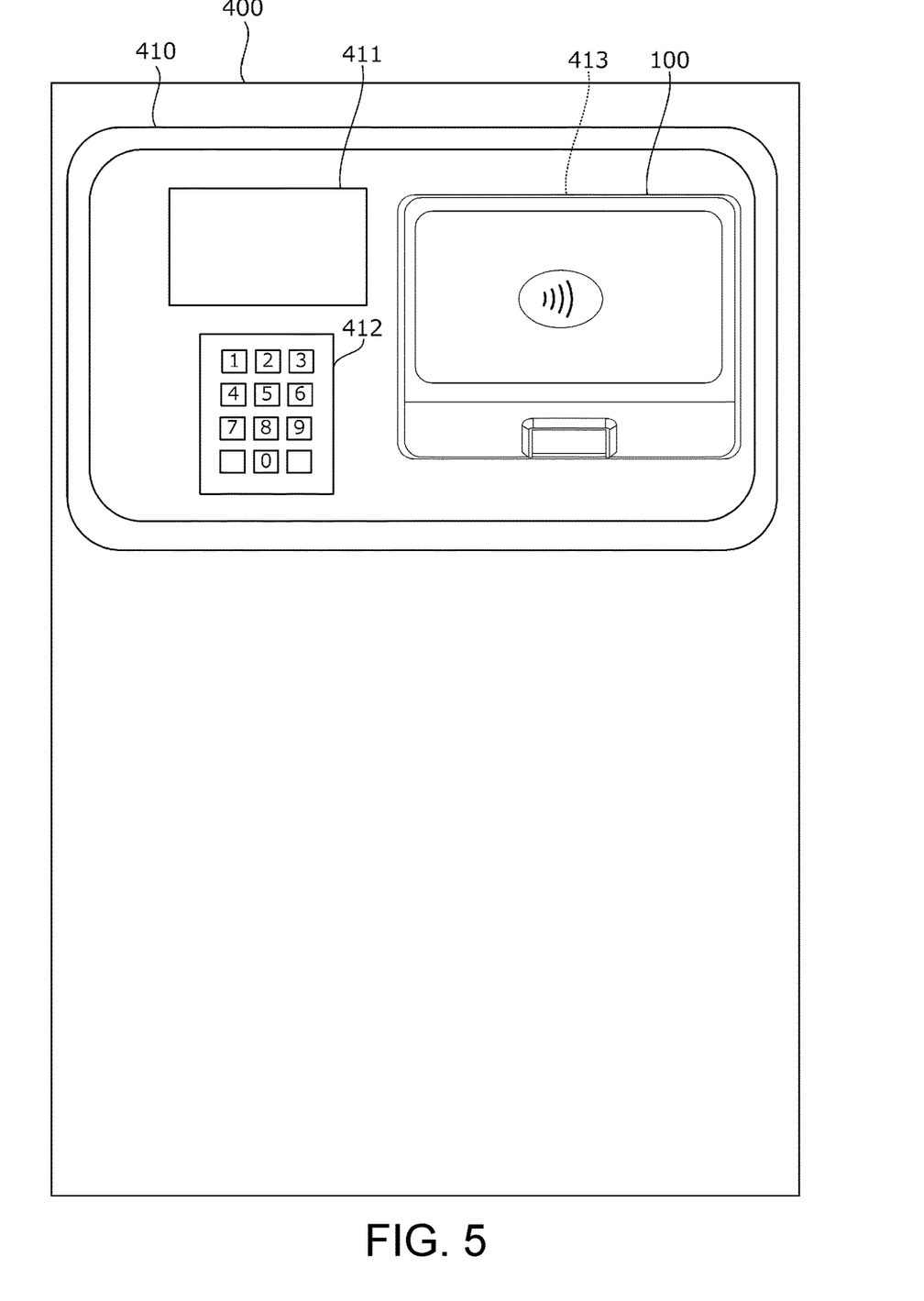
FIG. 5 is a diagram (No. 2) illustrating an example of the transaction terminal device provided with the module 100.

FIGS. 4 and 5 are diagrams each illustrating an example of a transaction terminal device provided with the module 100. The module 100 can be provided, for example, in a transaction terminal device 400 illustrated in FIG. 4. The transaction terminal device 400 is a transaction terminal device (host device of the module 100) that inputs and outputs digital information such as an ATM and a POS (Point Of Sale).

The transaction terminal device 400 has an operation panel 410 for allowing the operator of the transaction terminal device 400 to perform various operations. As illustrated in FIG. 4, the operation panel 410 is provided with a display screen 411, a numeric keypad 412, and an opening 413. The display screen 411 displays various information to the operator. Further, the display screen 411 may be a touch panel display or the like that accepts touch operation from an operator. The numeric keypad 412 accepts numerical input by key operation from the operator.

The opening 413 is an opening having a substantially rectangular shape when viewed from the front surface side of the module 100, and is an example of a predetermined space for providing the module 100. As illustrated in FIG. 5, the housing 130 of the module 100 is fitted into the opening 413 and fixed by screwing or the like.

The wires of the wireless unit 110 and the scanner unit 120 are connected to the control device (for example, see FIG. 6) inside the transaction terminal device 400.

The shape and the size of the housing 130 of the module 100 are designed to match the shape and the size of the opening 413. At this time, the vertical length of the module 100 can be shortened as described above, and therefore even when the shape and the size are limited, it is possible to realize the module 100 that has the wireless unit 110 having a sufficient antenna area, and also includes the scanner unit 120.

Although the opening 413 is described as an example of the predetermined space for providing the module 100, the predetermined space for providing the module 100 is not limited to the opening 413. For example, the predetermined space for providing the module 100 may be a flat plate member or the like having a screw hole or the like to which the back surface member 133 of the module 100 can be fixed. In this case, the flat plate member or the like is provided with an opening for introducing the wires of the wireless unit 110 and the scanner unit 120 into the control device inside the transaction terminal device.

<A Hardware Configuration of the Control Device 610 and the Module 100 of the Transaction Terminal Device 400>

Figure 6:
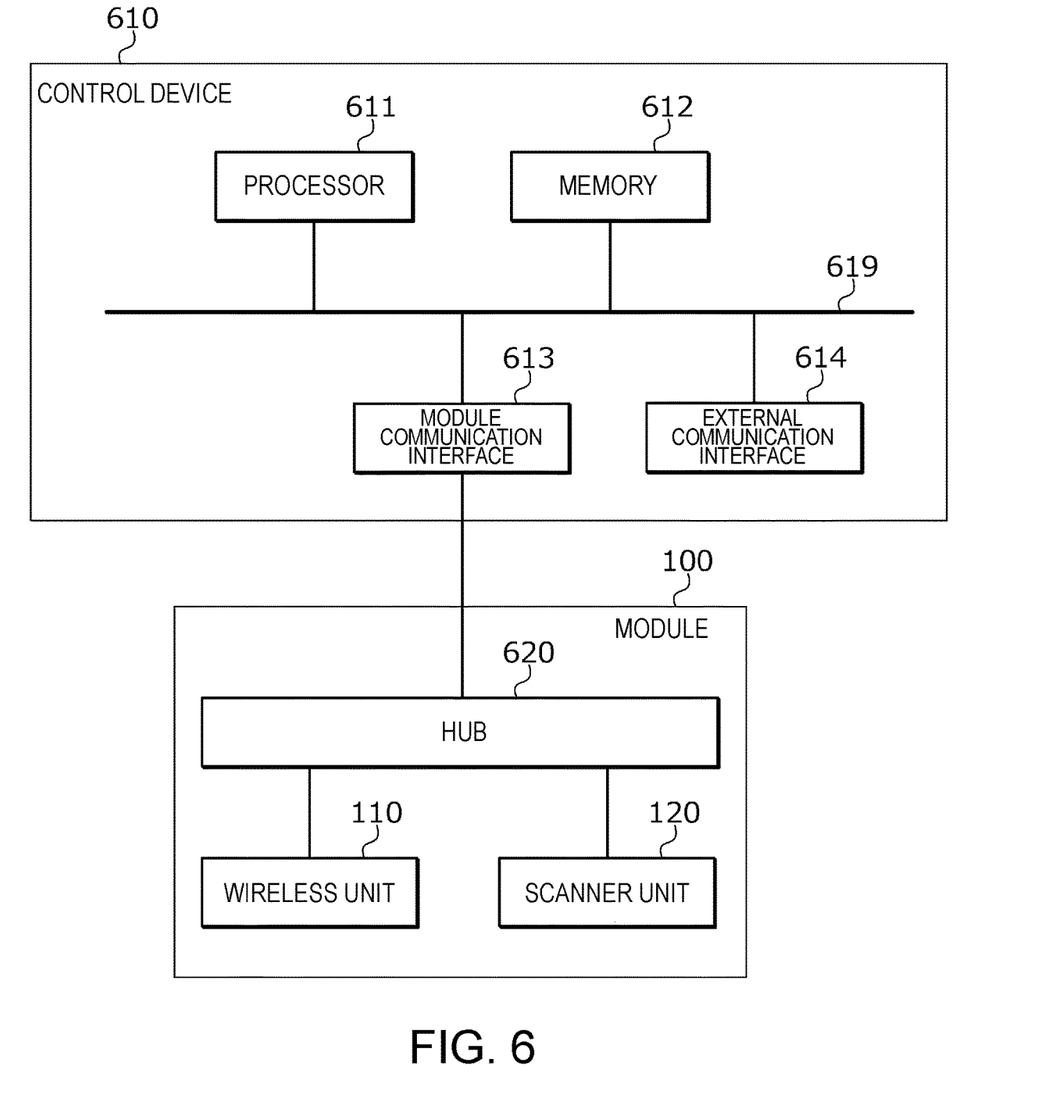
FIG. 6 is a diagram illustrating an example of a hardware configuration of a control device 610 and the module 100 of a transaction terminal device 400.

FIG. 6 is a diagram illustrating an example of the hardware configuration of the control device 610 and the module 100 of the transaction terminal device 400.

The transaction terminal device 400 is provided with the control device 610 that controls the module 100. The control device 610 includes a processor 611, a memory 612, a module communication interface 613, and an external communication interface 614. The processor 611, the memory 612, the module communication interface 613 and the external communication interface 614 are connected by, for example, a bus 619.

The processor 611 is a circuit that performs a signal process, and is, for example, a CPU (Central Processing Unit) that controls the entire control device 610. The processor 611 may be realized by other digital circuits such as an FPGA (Field Programmable Gate Array) and a DSP (Digital Signal Processor). Further, the processor 611 may be realized by combination of a plurality of digital circuits.

The memory 612 includes, for example, a main memory and an auxiliary memory. The main memory is, for example, a RAM (Random Access Memory). The main memory is used as a work area for the processor 611.

The auxiliary memory is, for example, a non-volatile memory such as a magnetic disk, an optical disk, and a flash memory. Various programs for operating the control device 610 are stored in the auxiliary memory. The program stored in the auxiliary memory is loaded into the main memory and executed by the processor 611.

The module communication interface 613 is a communication interface that communicates with a module (for example, the module 100) provided in the transaction terminal device 400.

It is a communication interface for communicating with (for example, module 100). The module communication interface 613 is, for example, an interface such as a USB (Universal Serial Bus). The module communication interface 613 is controlled by the processor 611.

The external communication interface 614 is a communication interface for communicating with the outside of the transaction terminal device 400. The external communication interface 614 is, for example, a communication interface of a LAN (Local Area Network) or a WLAN (Wireless LAN). The external communication interface 614 is controlled by the processor 611.

The module 100 may include a hub 620 in addition to the wireless unit 110 and the scanner unit 120. In FIG. 6, the housing 130 is not illustrated.

The hub 620 is a line concentrator that is connected to the module communication interface 613 of the control device 610 via a communication cable and relays communication between the wireless unit 110 and the control device 610 and between the scanner unit 120 and the control device 610. When the module communication interface 613 of the control device 610 is a USB communication interface, the hub 620 is a USB hub. In this case, the communication cable that connects the hub 620 and the module communication interface 613 is a USB cable.

The wireless unit 110 and the scanner unit 120 are connected to the control device 610 by the hub 620, so that the module 100 and the control device 610 can be connected to each other with a single communication cable while the wireless unit 110 and the scanner unit 120 are incorporated in the module 100. Therefore, the work of providing the module 100 in the transaction terminal device 400 is facilitated. In addition, it is possible to reduce the number of required communication cables and the number of ports used for the module 100 among the communication ports of the control device 610.

<Main Effects of this Embodiment>

According to the module 100, the antenna of the wireless unit 110 is disposed in parallel with the first front surface member 131 disposed obliquely with respect to the vertical direction, so that it is possible to shorten the vertical length of the module 100 without reducing the antenna area of the wireless unit 110. Therefore, it is possible to provide the small module 100 incorporating the wireless unit 110 and the scanner unit 120.

As described above, the following matters are disclosed in this specification.

(1) A module provided in a predetermined space of an operation panel of a transaction terminal device to input and output a digital information, the module including: a wireless unit, configured to perform a data communication using at least a near field communication; a scanner unit, configured to read an external code; and a housing, configured for incorporating the wireless unit and the scanner unit. The housing includes: a first front surface member, disposed obliquely with respect to a vertical direction; and a second front surface member, provided below the first front surface member and disposed obliquely with respect to the vertical direction. A lower side of the first front surface member projects toward an operator with respect to an upper side of the first front surface member. An upper side of the second front surface member projects toward the operator with respect to a lower side of the second front surface member. An antenna of the wireless unit is provided on a back side of the first front surface member. A lower side of the antenna projects toward the operator with respect to an upper side of the antenna. And, the scanner unit is configured to read the external code through an opening of the second front surface member.

When the module is configured as described in (1), the antenna of the wireless unit is disposed obliquely with respect to the vertical direction, so that it is possible to shorten the vertical length of the module without reducing the antenna area of the wireless unit. Therefore, it is possible to provide the small module incorporating the wireless unit and the scanner unit.

(2) The module described in (1), in which the antenna of the wireless unit is disposed in parallel with the first front surface member.

When the module is configured as described in (2), the antenna of the wireless unit is disposed in parallel with the first front surface member disposed obliquely with respect to the vertical direction, so that it is possible to shorten the vertical length of the module without reducing the antenna area of the wireless unit. Therefore, it is possible to provide the small module incorporating the wireless unit and the scanner unit.

(3) The module described in (1) or (2), in which at least one part of the scanner unit is disposed at such a position as to overlap a lower side of the wireless unit in a horizontal direction.

When the module is configured as described in (3), at least the one part of the scanner unit is disposed in a space created by disposing the antenna of the wireless unit in parallel with the first front surface member disposed obliquely with respect to the vertical direction, and therefore it is possible to further shorten the vertical length of the module.

(4) The module described in any one of (1) to (3), further comprising: a line concentrator, configured to concentrate respective wires of the wireless unit and the scanner unit and perform connection to a control device of the transaction terminal device.

When the module is configured as described in (4), it is possible to perform connection between the wireless unit and the control device of the transaction terminal device and between the scanner unit of the control device of the transaction terminal device by a single communication cable while incorporating the wireless unit and the scanner unit.

What is claimed is:

1. A module provided in a predetermined space of an operation panel of a transaction terminal device to input and output a digital information, the module comprising:
   a wireless unit, configured to perform a data communication using at least a near field communication;
   a scanner unit, configured to image and read an external optically readable code for processing image data obtained by imaging; and
   a housing, configured for incorporating the wireless unit and the scanner unit,
      wherein the housing comprises:
         a first front surface member, disposed obliquely with respect to a vertical direction; and
         a second front surface member, provided below the first front surface member and disposed obliquely with respect to the vertical direction,
      wherein a lower side of the first front surface member projects toward an operator with respect to an upper side of the first front surface member, and the first front surface member is inclined with respect to the vertical direction so that the upper side of the first front surface member is further away from the operator relative to the lower side of the first front surface member,
      an upper side of the second front surface member projects toward the operator with respect to a lower side of the second front surface member, and the second front surface member is inclined with respect to the vertical direction so that the lower side of the second front surface member is further away from the operator relative to the upper side of the second front surface member,
      an antenna of the wireless unit is provided on a back side of the first front surface member,
      a lower side of the antenna projects toward the operator with respect to an upper side of the antenna, and
      an inclination angle of the second front surface member with respect to the vertical direction is set to be larger than an inclination angle of the first front surface member with respect to the vertical direction, such that the scanner unit is configured to irradiate an object to be read with an irradiation light so that an irradiation direction of the irradiation light is obliquely downward and, in a case that the external optically readable code is to be read through an opening of the second front surface member, the irradiation light is prevented from directly irradiating eyes of the operator.

2. The module according to claim 1, wherein
the antenna of the wireless unit is disposed in parallel with the first front surface member.

3. The module according to claim 2, wherein
at least one part of the scanner unit is disposed at such a position as to overlap a lower side of the wireless unit in a horizontal direction.

4. The module according to claim 3, further comprising:
a line concentrator, configured to concentrate respective wires of the wireless unit and the scanner unit and perform connection to a control device of the transaction terminal device.

5. The module according to claim 2, further comprising:
a line concentrator, configured to concentrate respective wires of the wireless unit and the scanner unit and perform connection to a control device of the transaction terminal device.

6. The module according to claim 1, wherein
at least one part of the scanner unit is disposed at such a position as to overlap a lower side of the wireless unit in a horizontal direction.

7. The module according to claim 6, further comprising:
a line concentrator, configured to concentrate respective wires of the wireless unit and the scanner unit and perform connection to a control device of the transaction terminal device.

8. The module according to claim 1, further comprising:
a line concentrator, configured to concentrate respective wires of the wireless unit and the scanner unit and perform connection to a control device of the transaction terminal device.

* * * * *